Figure 14:
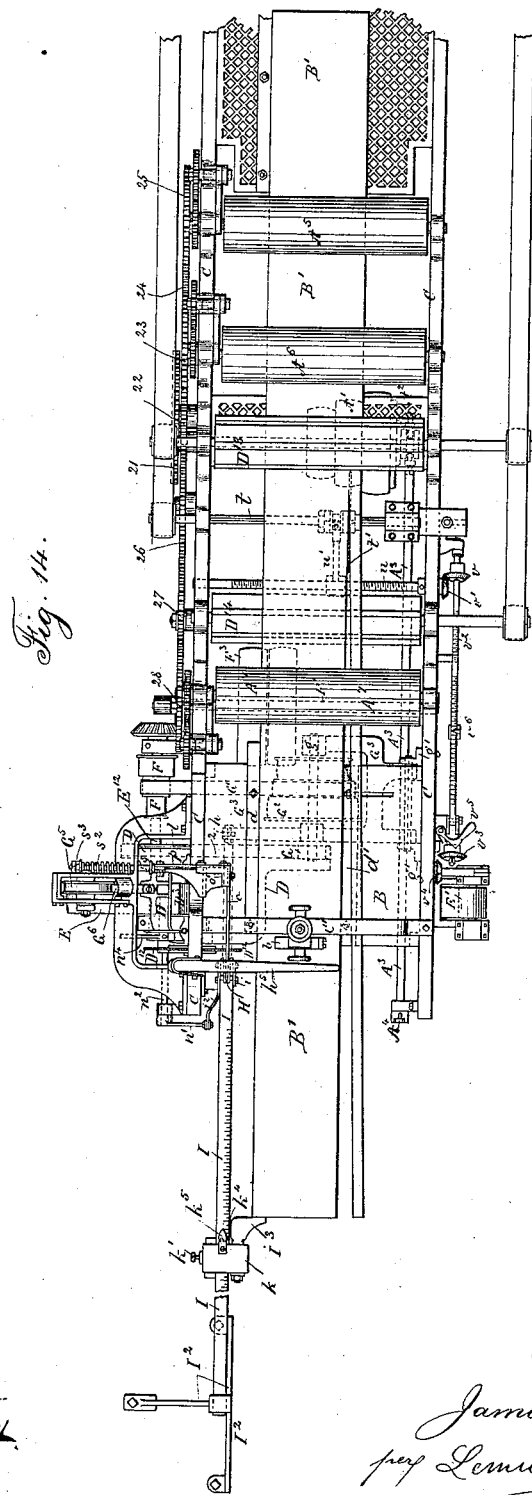

(No Model.) 6 Sheets—Sheet 1.
J. F. WELCH.
CIRCULAR SAWING MACHINE.
No. 334,141. Patented Jan. 12, 1886.
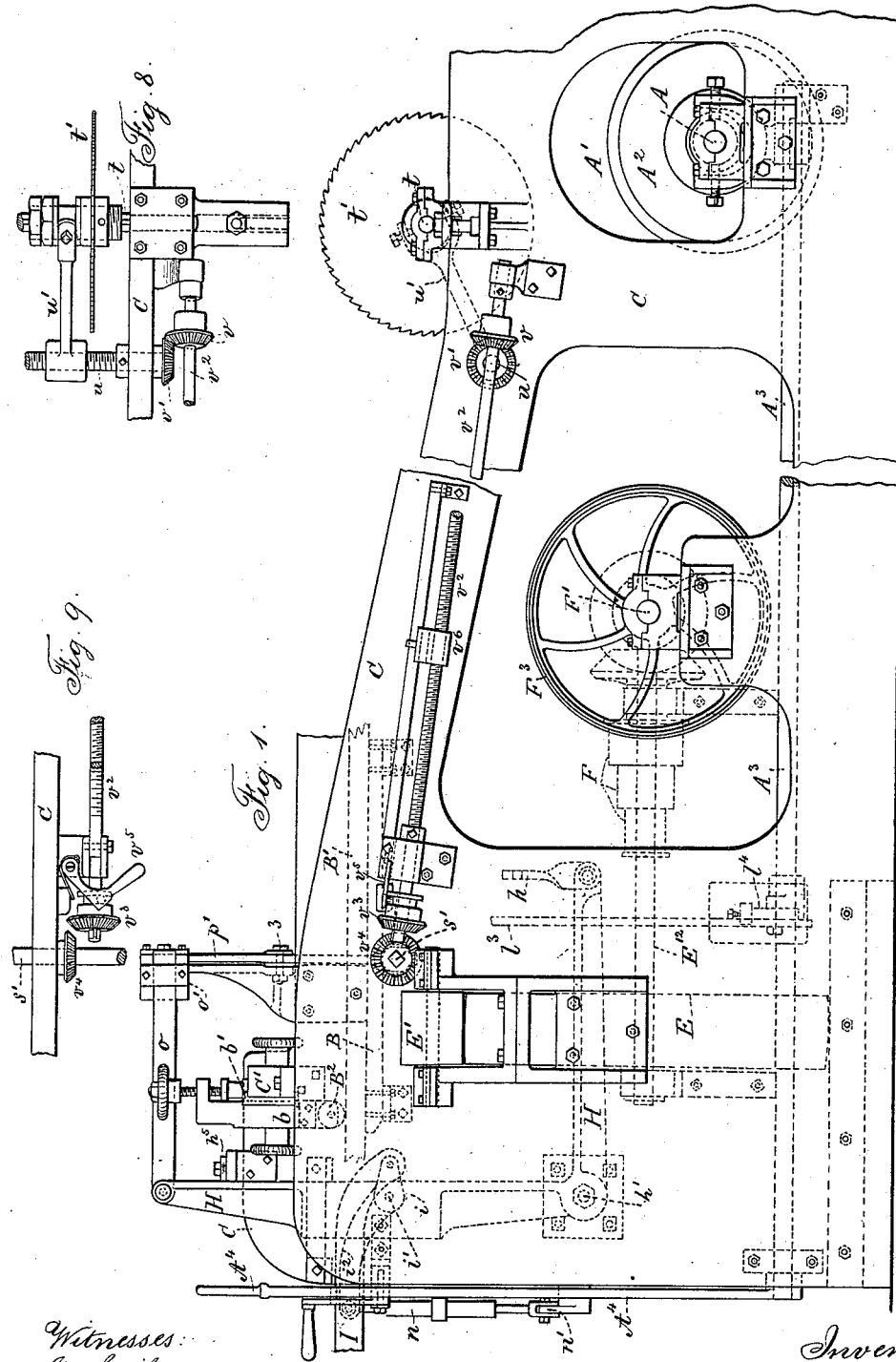
Witnesses
J. Staib
Chas H. Smith
Inventor:
James F. Welch
per Lemuel W. Serrell atty (No Model.)    6 Sheets—Sheet 2.
J. F. WELCH.
CIRCULAR SAWING MACHINE.
No. 334,141.    Patented Jan. 12, 1886.
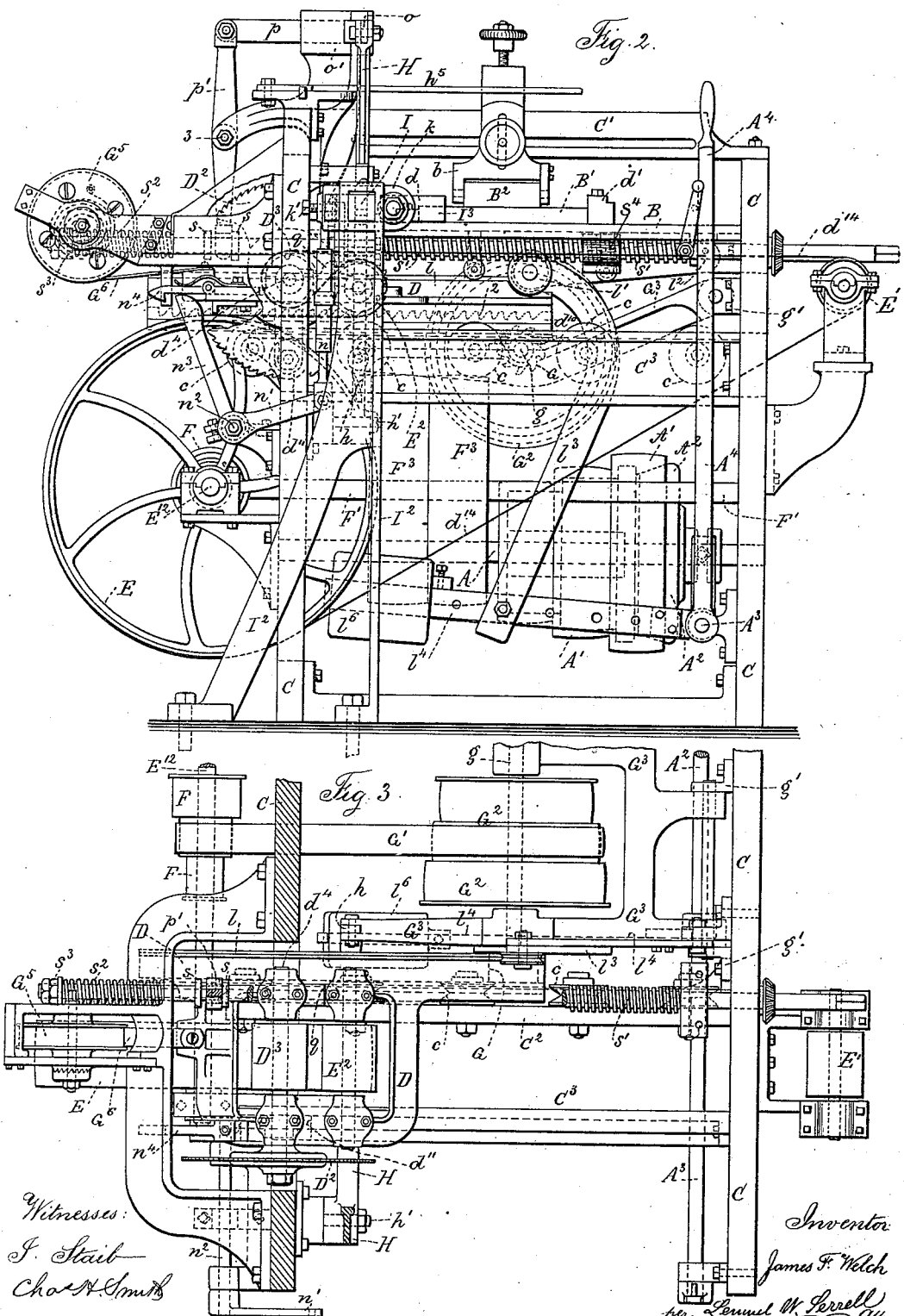
Witnesses:
J. Staib
Chas H. Smith
Inventor
James F. Welch
per Lemuel W. Serrell
Atty (No Model.) 6 Sheets—Sheet 3.
J. F. WELCH.
CIRCULAR SAWING MACHINE.
No. 334,141. Patented Jan. 12, 1886.
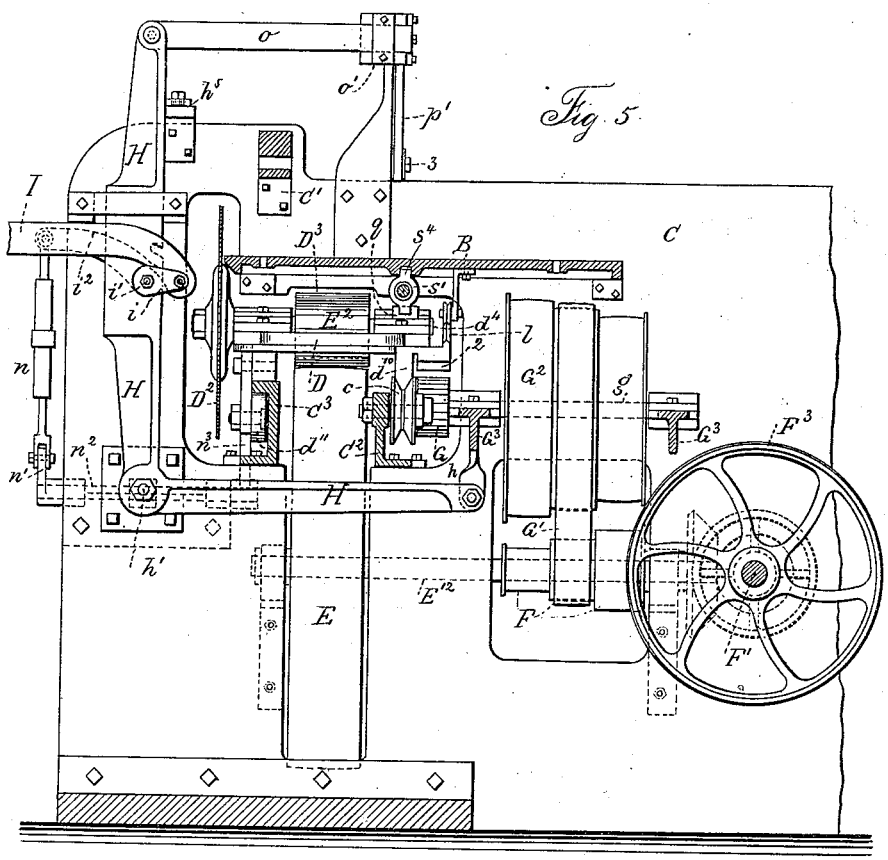
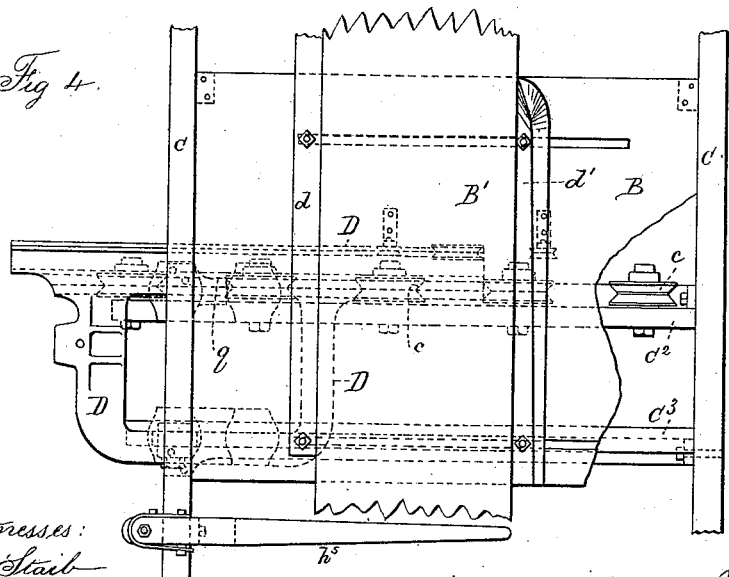
Witnesses:
J. Staib
Chas H. Smith
Inventor:
James F. Welch
per Lemuel W. Serrell atty (No Model.) 6 Sheets—Sheet 4.
J. F. WELCH.
CIRCULAR SAWING MACHINE.
No. 334,141. Patented Jan. 12, 1886.
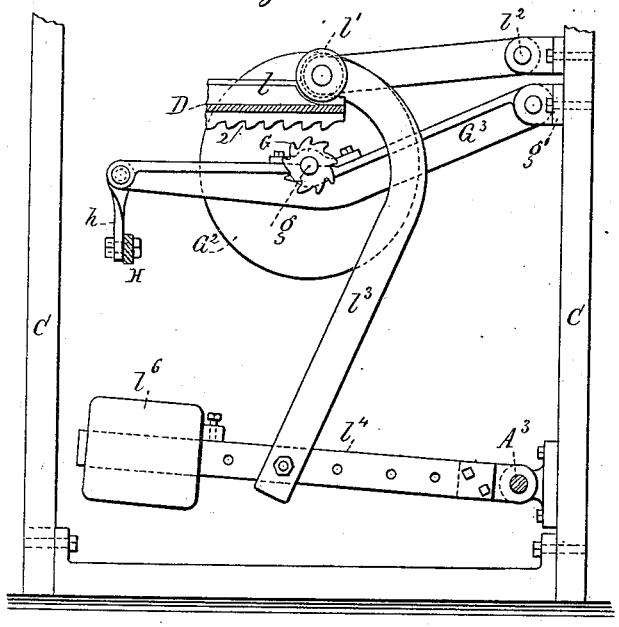
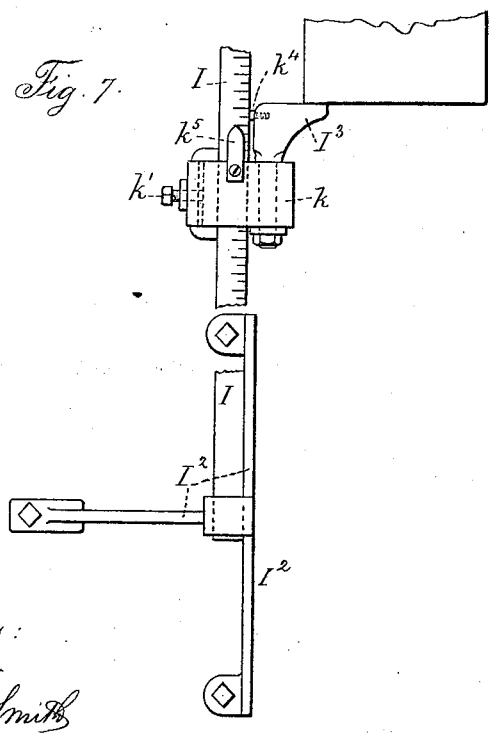
Witnesses:
J. Staib
Chas. H. Smith
Inventor:
James F. Welch
per L. W. Serrell, atty (No Model.)  6 Sheets—Sheet 5.
J. F. WELCH.
CIRCULAR SAWING MACHINE.
No. 334,141. Patented Jan. 12, 1886.
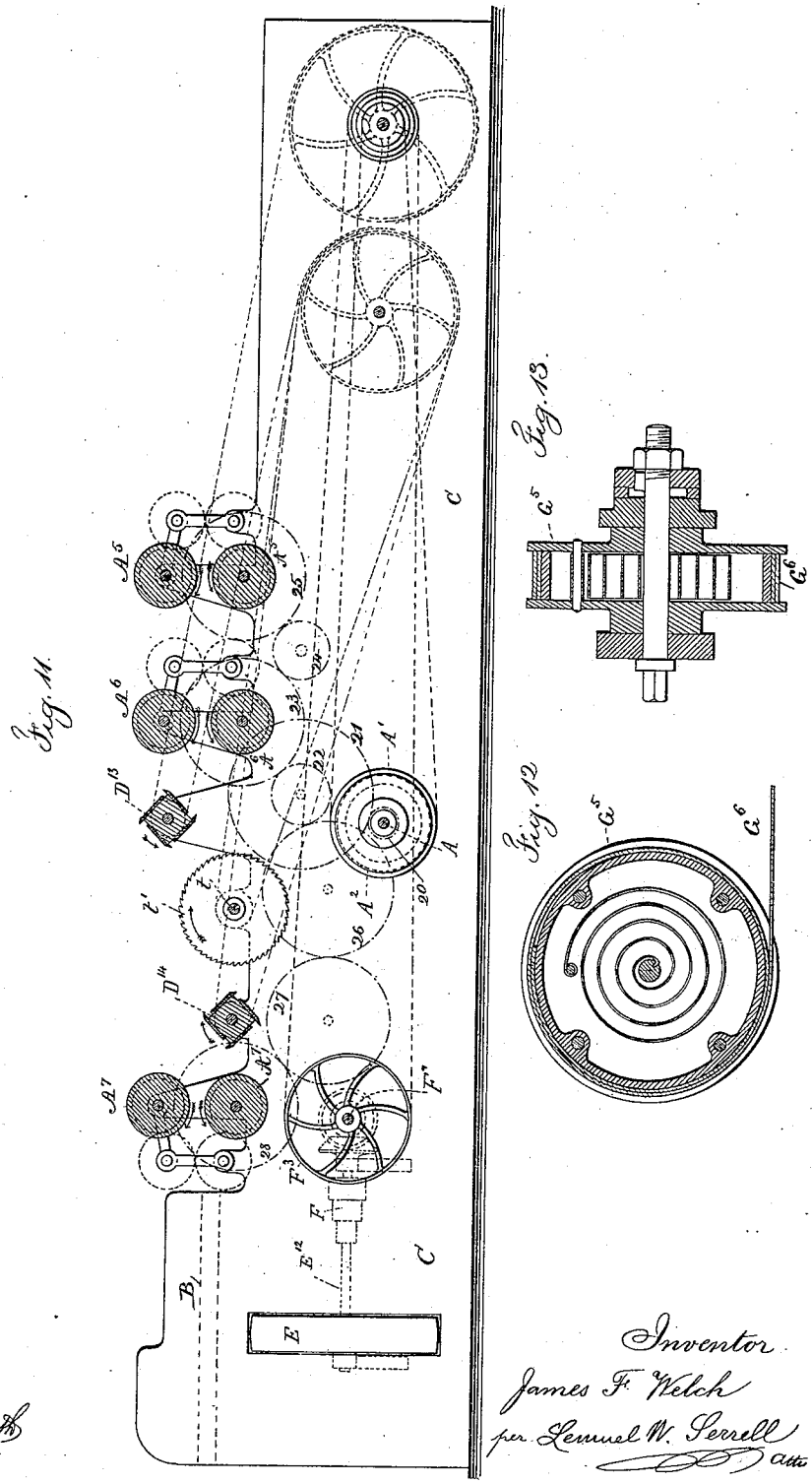
Witnesses:
J. Staib
Chas. H. Smith
Inventor
James F. Welch
per Lemuel W. Serrell
Atty (No Model.)

6 Sheets—Sheet 6.

J. F. WELCH.
CIRCULAR SAWING MACHINE.

No. 334,141. Patented Jan. 12, 1886.

Witnesses
J. Staib
A. W. Bright

Inventor
James F. Welch
per Lemuel W. Serrell
atty

UNITED STATES PATENT OFFICE.

JAMES F. WELCH, OF BROOKLYN, NEW YORK.

CIRCULAR SAWING MACHINE.

SPECIFICATION forming part of Letters Patent No. 334,141, dated January 12, 1886.

Application filed October 22, 1884. Serial No. 146,158. (No model.)

*To all whom it may concern:*

Be it known that I, JAMES F. WELCH, of Brooklyn, (Greenpoint,) in the county of Kings and State of New York, have invented an Improvement in Machines for Sawing Boards into Lengths, of which the following is a specification.

This machine is especially adapted to crosscutting wood for box-making. It is available as an adjunct to a planing-machine, but it may be used separately therefrom.

In my machine the board is moved along by suitable feed-rollers. If it is used with a planing-machine, the feed-rollers employed are those of the planing-machine. The board passes along over a table, its end comes in contact with a gage, and by it the gage is moved, and the mechanism that is brought into action by the movement of the gage stops the feed of the board and causes a crosscut-saw to travel across and separate one length of the board. As the saw completes its cutting, the movement of its carriage liberates a slide, and the saw and carriage are suddenly drawn back to their normal positions, and the feed mechanism is again connected, and the board is moved along for the same operations to be repeated.

In the drawings, Figure 1 is a partial side elevation. Fig. 2 is an elevation at the delivery end of the machine. Fig. 3 is a sectional plan below the table upon which the board rests. Fig. 4 is a plan of the table upon which the board rests and the parts adjacent thereto. Fig. 5 is a section longitudinally of the machine, showing the table and saw-carriage. Fig. 6 is a detached view of the pinion that gives motion to the saw-carriage. Fig. 7 is a plan of the gage and portions of the gage-bar. Fig. 8 is a plan of the edging-saw and its adjusting devices. Fig. 9 is a detached plan of the shifting-pinion for connecting the screws when adjusting the parts to vary the extent of motion given to the crosscut-saw and carriage, and to vary the distance between the edging-saws. Fig. 10 is a section of the gage-bar and elevation of the gage. Fig. 11 is a diagram illustrating the relative positions of the sawing and planing devices. Figs. 12 and 13 are sections through the spring-barrel and the belt upon the same, said sections being respectively across and in line with the axis of such barrel; and Fig. 14 is a plan view of my sawing-machine.

The shaft A is provided with the pulleys $A'$, and to these a belt passes from a driving-pulley or other source of power. These pulleys are kept in constant motion.

Upon the shaft A is the sliding frictional clutch $A^2$, which, when pressed against the conical recess at the end of the cone of pulleys, connects the same to the shaft A, and causes the latter to revolve, and when drawn away the shaft A stops. This shaft A is connected by suitable gearing with a pair of feed-rollers, $A^5$, $A^6$, and $A^7$, which move the board along through the machine and over the table B, or allow the same to stop while being sawed off transversely.

The pinion 20, wheels 21, 22, 23, 24, 25, 26, 27, and 28 (shown by dotted lines in Fig. 11,) are made use of to rotate the feed-rollers in unison by the motion derived from the shaft A and pinion 20.

$A^3$ is a rock-shaft with a fork to slide the friction-clutch $A^2$, and $A^4$ is a lever by which hand-power can be used to stop or start the feed.

The board to be sawed is shown at $B'$. It is held down upon the table B by the roller $B^2$, that is in adjustable jaws $b$ in a stationary head, $b'$, supported by the cross-bar $C'$, that extends across from one side frame, C, to the other, and upon this table are the adjustable pieces $d\ d'$, between which the board is moved endwise. These side frames, C, are of cast-iron and adapted to receive and sustain the other parts of the machine. Between them there are cross-bearers $C^2\ C^3$, one of which is provided with V-grooved rollers $c$, that support the rib $d^{10}$ upon the saw-carriage D, and the other bearer, $C^3$, is box-shaped, and the top edge supports the saw-carriage D, and there are rollers $d^{11}$ running within the bearer $C^3$, the arbors of which are upon straps extending down from the saw-carriage D, so that said saw-carriage can be moved transversely of the machine with but little friction, and it cannot lift by the action of the saw. The crosscut circular saw $D^2$ is upon an arbor, $d^4$, in bearings upon the carriage D, and it is provided with a driving-pulley, $D^3$. The belt $d^{14}$, for driving the saw, passes around the fixed drum E, at one side of the machine, over the fixed pulley E', at the other side of the machine, around the pulley D³ of the saw, then around a second pulley, E², on the saw-carriage D, thence around the drum E. These parts are seen in full and dotted lines in Fig. 2.

It will be apparent that the saw D² can be revolved continuously, and that the belt and pulleys, arranged as described, allow the saw and carriage to be moved across without the belt becoming slack.

The drum E, shaft E¹², and pulleys F are revolved continuously by suitable power. I have represented a cross-shaft, F', and bevel-gears (see dotted lines, Figs. 1 and 5) as the means for driving the shaft E¹², and upon the shaft F' are the fast and loose pulleys F³, for the driving-belt. From the pulleys F an endless belt, G', passes to the cone of pulleys G² upon a shaft g, having at its end a pinion, G. This shaft g is in a frame, G³, that is pivoted to the bearings g' upon the frame C. When this frame G³ is raised, the pinion G is brought into contact with the rack-teeth 2 upon the under side of the saw-carriage, and the direction of rotation is such that the carriage and saw are moved across to saw off the board. When the frame G³ is lowered, the saw-carriage is liberated from the pinion, and it can be moved back to its normal position. I employ, by preferenc, a barrel, G⁵, in which is a volute spring, and around this barrel there is a strap, G⁶, fastened at one end to the barrel and at the other end to the saw-carriage. When the carriage is being moved by the pinion G, the strap is drawn off the barrel and the spring wound up. As soon as the pinion drops and the saw-carriage is liberated, the spring-barrel draws the carriage back instantly to its normal position. The frame G³ extends beyond the pinion G as an arm, and to it is connected by the link h a bent lever, H, the pivot of which is at h', and the vertical arm of which passes through the forked end of the horizontal gage-bar I, to which lever the said forked end is connected by the links i i. These links i are at one end fastened to a shaft, i', that passes through the lever H, and it has upon it a lever-arm, i², by which the links i can be swung and the forked end of the gage-bar I raised, as and for a purpose hereinafter described. The gage-bar I is of considerable length, so as to be much longer than the sections of wood to be sawed off. Only portions of this gage-bar are shown. At the extreme farthest end of the gage-bar there is a three-legged frame, I². (Shown in plan in Fig. 7.) This is fastened to the floor, and rises to the proper height to support the outer end of the gage-bar. The gage-bar is horizontal, and it can slide freely endwise through the bearing at the top of the frame I², and the bearing is also made so that the forked end of the gage-bar can be lifted by the links i aforesaid, so that the gage-bar in this latter position is inclined. The object of this is to allow the gage I³, that is at the end of the piece of board that is being sawed off, to be lifted, so that it will not press against the end of the board after it has been stopped and while the sawing is being performed.

The gage-bar is divided up into feet and inches or other divisions, commencing from the point at which the crosscut-saw operates, and upon the said gage-bar the gage I³ is clamped, so as to be adjusted to the proper position for the length to be sawed off. I prefer to employ the stock k, that surrounds the gage-bar and is clamped by the screw k', and the gage itself is held by a horizontal circular stem or rod passing through the stock k, and provided with a nut. This gage forms a stop for the end of the board, and occupies the position to the board indicated in Fig. 7. The gage can be swung upwardly out of the way of the board when it is not to be used, as indicated by dotted lines in Fig. 10; but when turned down the gage is held horizontally by the screw k⁴ against the side of the gage-bar.

The finger k⁵ indicates the proper measurement from the crosscut-saw. It is now to be understood that as the board is moved along by the feed-rollers it comes into contact with the gage I³ and moves the gage I³, the gage-bar I, and the lever H, and in so doing the lever H raises the pinion G and frame G³ and connects the pinion with the rack on the saw-carriage, as aforesaid, and at the same moment the feed motion is stopped and the board stands still while being sawed. There is upon the saw-carriage a rib, l, the end of which is cut off as a steep incline or arc of a circle, and there is a roller, l', resting on this rib. This roller is at the end of a horizontal arm pivoted at l² on the frame C, and from the roller a link, l³, passes down to the lever l⁴, that extends out from the clutch-shaft A³, so that the moment the saw-carriage starts by the action of the pinion, and before the saw has moved far enough to reach the edge of the board, the rib l runs under the roller l', lifting the same and the lever l⁴ and disengaging the friction-clutch A² aforesaid and stopping the feed. After the sawing is complete and the carriage has been drawn back as aforesaid the rib l draws out from under the roller l', and the weight l⁶, acting upon the lever l⁴, re-engages the friction-clutch, and the feed is brought into action again. The arm i² is connected by a link, n, with the lever n' upon the shaft n², supported in bearings on the frame C, and at the other end of the shaft n² is an arm, n³, extending up beneath the saw-carriage, and upon the saw-carriage is a spring-hook, n⁴, which acts upon the arm n³ after the carriage has commenced to move and after the feed has been stopped, and by swinging such arms n' n³ and moving the link n the arm i² and the links i are turned to lift up the gage-bar and raise the gage above the end of the board, as before described, so that it will not be against the piece of board as it drops, neither will it prevent the return movement of the gage-bar endwise for the next operation. The weight of the pinion-frame $G^3$, pinion G, and pulleys $G^2$ is upon the bent lever H, tending to draw the gage-bar toward the end of the board; hence as soon as the gage is liberated, as last described, the pinion G would drop were it not for a slide-bar, $o$, attached to the upper end of the lever H and moving at its end back and forth in the stationary box $o'$, and in this box $o'$ is a slide-bar, $p$, and a lever, $p'$, connected thereto and pivoted at 3, and the lower end of this lever is forked and goes between collars $s$ upon the screw $s'$. This screw is in bearings upon the frames C. It can be rotated and it also is free to be moved endwise. The spring $s^2$, around the plain part of the screw, acts between the frame and the nut $s^3$ to move the same endwise. As soon as the board acting against the gage pushes it along and moves the lever H and other parts, the slide-bar $o$ is drawn back in its box, and the spring $s^2$ gives an end motion to the screw $s'$, moving it and the lever $p'$, and forcing the slide $p$ along in the box $o'$ across the end of the slide-bar $o$; hence the lever H cannot move or the pinion G and frame descend until the slide-bar $p$ is drawn back out of the way of the end of the slide-bar $o$. This last-named operation is effected, as soon as the board B' has been sawed off, by the block $q$ on the saw-carriage D coming into contact with the nut $s^4$ on the screw $s'$ and giving to the screw $s'$ an end motion and compressing the spring $s^2$, and by the collar moving the lever $p'$ and drawing back the slide-bar $p$ from across the end of the slide-bar $o$ and allowing said bar $o$ to move endwise through the box $o'$ as the lever H is moved, and the pinion G drops, and the saw is drawn back and the board fed forward, as before described. The screw $s'$ has a square at one end, by which it may be rotated, and in so doing the nut $s^4$ will be moved in one direction or the other, so that the crosscut-saw will be moved a greater or less distance, to suit the width of the wood that is being cut up. To prevent the nut $s^4$ revolving, it may be guided in a groove in the table B, as indicated in Fig. 5.

It is sometimes desirable to saw off the edges of the board, so as to make the same of uniform width. To effect this, I provide an arbor, $t$, with a saw, $t'$, upon it. This arbor and saw are revolved by suitable means. The saw is clamped to a sleeve that slides upon a feather or key upon the saw-arbor, and there is a cross-screw, $u$, with a nut and fork, $u'$, that holds the sleeve and fork, and by which the saw can be moved endwise upon its arbor, even while in motion, for the purpose of placing such saw at the proper position for edging the board and rendering it uniform in width. If desired, a second saw may be employed upon the arbor, for rendering the side next the gage $d$ smooth. When the saw $t'$ is being set, the nut $s^4$ may also be simultaneously set, and to effect this I connect the screw $s'$ to the screw $u$ by the bevel-gears $v$ $v'$, shaft $v^2$, and bevel-gears $v^3$ $v^4$. The bevel-gear $v^3$ is upon a square or feather at the end of the shaft $v^2$, and in its normal position it is out of gear with the bevel-gear $v^4$, as seen in Fig. 9, so that the nut $s^4$ and screw $s'$ may not be obstructed when the screw $s'$ is moved endwise, as aforesaid; but there is a lever, $v^5$, and handle by which the bevel-gear $v^3$ may be moved endwise of the shaft $v^2$ to connect the same with $v^4$, in order that the parts may all turn together when the screw $s'$ is revolved by a crank applied to its end. In this manner the edging-saw can be set simultaneously with the adjustment of the nut $s^4$, and in order to indicate with accuracy the width of the board as it is cut by the edging-saw I make a screw-thread upon the shaft $v^2$, and place thereon an indicator or gage nut, $v^6$, and provide a rule or measure upon the frame, divided into feet and inches or other measurements, so that the gage indicates the width of the board as cut by the edging-saw.

In order to saw off the rough end of a board when it has reached the crosscut-saw, I make use of the lever $h^5$, which is operated by hand and moves the lever H, raising the pinion G, stopping the feed, and carrying the saw across and cutting off the board near its end. This lever may be operated by hand at any time, so as to cut off the board into lengths that are different from those that are determined by the gage.

The cutters $D^{13}$ and $D^{14}$ are for planing the wood on the upper and under sides. These parts and the feeding-rollers $A^5$, $A^6$, and $A^7$ are not new in themselves, and are introduced herein to represent the manner in which my improvements are combined with them, and I remark that the feed-rollers $A^7$ and the cutters $D^{14}$ might be dispensed with, if the wood is only to be planed upon one side.

I claim as my invention—

1. The combination, in a sawing-machine, with the bed B, crosscut circular saw, pulley, and saw-carriage, of a driving-pulley, E, and belt, a stationary pulley, E', and a pulley upon the saw-carriage, the same being below the bed B, a rack upon the saw carriage, and a pinion, G, upon a moving frame, $G^3$, to give motion to the saw-carriage in one direction, and a spring-barrel, $G^5$, and a strap connecting the same with the saw-carriage to return said carriage to its normal position, substantially as specified.

2. The combination, with the crosscut-saw and carriage and table upon which the board is moved along, of a gage-bar, I, extending in the direction of the movement of the board, an adjustable gage and stock upon the same, against which the board acts, the lever H, and the links $i$, by which the gage-bar is pivoted to the lever, the link $h$, the frame $G^3$, pivoted upon the frame C of the machine, and the pinion G, pinion-shaft, and pulley carried by the said frame $G^3$, and the rack upon the saw-carriage, whereby the movement of the board as fed operates the gage-bar and lever H, and raises the pinion G to move the saw and its carriage in sawing off the board, substantially as specified.

3. The combination, with the crosscut-saw and carriage and a table upon which the board is moved along, of the gage-bar I, lever H, pinion G, and rack for moving the saw and carriage across the board, the friction-clutch $A^2$ upon the shaft A, the shaft $A^3$, and the fork connecting said shaft to the clutch, the rib $l$, roller $l'$, link $l^3$, and the weighted lever $l^4$, upon the shaft $A^3$, whereby the first movement of the saw-carriage disconnects the clutch and stops the feed of the board, substantially as set forth.

4. The combination, with the crosscut-saw and its carriage, and the gage-bar I, lever H, connected with the said gage-bar, pinion G, and frame $G^3$, connected with the lever H and carrying the pinion G and rack for moving the saw, of the rib $l$, with an inclined end, the roller $l'$, the arm pivoted at $l^2$ upon the frame C, the curved link $l^3$, operated by said roller and rib, the lever $l^4$, and weight $l^6$, the shaft $A^3$, to which the lever $l^4$ is connected, the pulley $A'$, and frictional clutch $A^2$, substantially as set forth.

5. The combination, with the lever H, of the adjustable gage and stock, the gage-bar upon which the gage and stock are supported, the links $i$, and shaft $i'$, carrying such links and connecting the gage-bar to the lever H, the arms $i^2$ upon the shaft $i$, the link $n$ at the end of the arm $i^2$, the lever $n'$, shaft $n^2$, and lever $n^3$, for giving motion to the lever $n^3$ by the end movement of the gage-bar I, the spring-latch $n^4$, and the saw-carriage to which such latch is connected, whereby the adjustable gage is moved from contact with the end of the board by the movement of the saw-carriage, substantially as set forth.

6. The combination, with the lever H, links, and gage-bar, of the bar $o$, connected to the upper end of the lever H, the bar $p$, and their box $o'$, and the forked pivoted lever $p'$, to which the bar $p$ is connected, the screw $s'$, collars $s$, and nut $s^4$, and the saw carriage and its block $q$, for withdrawing the bar $p$ when the saw-carriage has moved the required distance and allowing the lever H to move and the frame $G^3$ and pinion G to descend, substantially as set forth.

7. The combination, with the crosscut-saw and carriage and its rack 2, pinion G, and pulleys, of the lever H and the gage-bar I, connected to and moving the same, the bar $o$, connected to the lever H, the bar $p$, and their box $o'$, the forked pivoted lever $p'$, to which the bar $p$ is hinged, screw-rod $s'$, collars $s$, spiral spring $s^2$, and nut $s^3$, whereby the bar $p$ is operated by the spring $s^2$ and pushed forward in the path of bar $o$ as it is withdrawn, thus locking the bar $o$ and retaining in position the mechanism described for operating the saw and carriage after the gage-bar has been disconnected from the boards, substantially as and for the purposes set forth.

8. The screw $s'$ and nut $s^4$ in bearings upon the frame of the machine, in combination with the crosscut-saw and carriage and the gage-bar I, against which the board is moved, the lever H, connected with the gage-bar, the pinion G and its frame, and the rack and pulleys for moving the saw-carriage in cutting off the board, substantially as set forth.

9. The combination, in a sawing-machine, with the crosscut-saw and its carriage and mechanism, substantially as specified, for actuating the same, of the edging-saw $t'$, the arbor $t$ for the same, the adjusting-screw $u$, and arm $u'$, for moving the saw along upon its shaft, the gears $v\ v'$, and screw-shaft $v^2$, connected with the screw $u$, and the indicator $v^6$ upon the screw $v^2$, to indicate the width of the board and allow for the easy adjustment of the parts, substantially as set forth.

10. The combination, with the crosscut-saw and its carriage, of the screw $s'$, parallel with such carriage, the nut $s^4$ upon the said screw, the edging-saw $t'$ and its shaft, the screw $u$, parallel with the saw-shaft, and the arm $u'$ upon such screw, to hold and adjust the saw endwise of the shaft, and the shaft $v^2$ and gearing for connecting the screw-shafts $s'$ and $u$, so that the nut $s^4$ and edging-saw $t'$ may be simultaneously adjusted, substantially as set forth.

11. The combination, in a wood-working machine, of feeding-rollers for moving the board, a crosscut-saw and a carriage for the same, a gage-bar, I, extending beyond the crosscut-saw, and a stock and gage upon the same for the end of the board, whereby such gage-bar and gage receive a motion from the board as it is fed along, and mechanism, substantially as specified, between the gage-bar and the driving pulley of the feed-rollers for stopping the rollers by the end movement of the board, mechanism, substantially as specified, for moving the crosscut-saw and carriage and sawing off the board, and mechanism, substantially as specified, between the crosscut-saw carriage and gage-bar for moving the gage-bar by the saw-carriage and separating the gage from the end of the board, substantially as set forth.

Signed by me this 13th day of August, A. D. 1884.

JAMES F. WELCH.

Witnesses:
GEO. T. PINCKNEY,
WILLIAM G. MOTT.